United States Patent [19]
Livingston

[11] Patent Number: 6,159,524
[45] Date of Patent: Dec. 12, 2000

[54] EDIBLE SPREAD BASED ON OLIVE OIL AS THE MAJOR FAT COMPONENT

[75] Inventor: Robert Middelton Livingston, Westcliff-on-Sea Essex, United Kingdom

[73] Assignee: Unilever Patent Holdings B.V., Rotterdam, Netherlands

[21] Appl. No.: 08/292,184

[22] Filed: Aug. 19, 1994

Related U.S. Application Data

[63] Continuation of application No. 07/823,958, Jan. 23, 1992, abandoned.

[30]     Foreign Application Priority Data

Jan. 23, 1991 [GB] United Kingdom .................. 9101462

[51] Int. Cl.⁷ ...................................................... A23D 7/02
[52] U.S. Cl. .......................................... 426/603; 426/602
[58] Field of Search .................................... 426/602, 603, 426/663

[56]                  References Cited

U.S. PATENT DOCUMENTS

| 2,814,633 | 11/1957 | Gooding . | |
|---|---|---|---|
| 3,949,105 | 4/1976 | Wieske | 426/603 |
| 4,087,564 | 5/1978 | Poot | 426/603 |
| 4,341,812 | 7/1982 | Ward | 426/603 |
| 4,533,561 | 8/1985 | Ward . | |
| 4,590,087 | 5/1986 | Pronk | 426/603 |
| 4,610,889 | 9/1986 | Schmidt | 426/603 |

FOREIGN PATENT DOCUMENTS

| 0115655 | 8/1984 | European Pat. Off. . |
|---|---|---|
| 0121948 | 10/1984 | European Pat. Off. . |
| 0304115 | 2/1989 | European Pat. Off. . |
| 0369519 | 5/1990 | European Pat. Off. . |
| 0445849 | 9/1991 | European Pat. Off. . |
| 2660160 | 3/1990 | France . |
| 2660160 | 10/1991 | France . |
| 2244717 | 12/1991 | United Kingdom . |

OTHER PUBLICATIONS

Gollan, J J, "Utilization of Animal Fats in Margarine Production", Boletin Tecnico Labal 1981 vol. 4 pp. 2–6 English Abstract Gavriilidou, et al, "Chemical Esterification of Olive–Tristearate Blends for Margarine" International J. of Food Science 1991 vol. 26 (5) pp. 451–456 English Abstract Potter 1973 Food Science AVI Publishing Westport CT p. 442.

Gurr 1971 Lipid Bio Chemistry Cornell University Press Ithaca NY p. 24–26.

*Primary Examiner*—Carolyn Paden
*Attorney, Agent, or Firm*—Pillsbury Madison & Sutro LLP

[57]                  ABSTRACT

The present invention concerns the technical field of edible spreads. Consumers have exhibited a preference for fats which are relatively low in saturates, low in trans fatty acids, low in sixteen-carbon fatty acids and contain some polyunsaturated fats. In a known product the fat phase comprises around 80 wt % of the product and consists of a blend of around 40 wt % olive oil and 60 wt % partially hardened olive oil. The invention provides an edible spread comprising from 80–5 wt % fat and 95–20 wt % of an aqueous phase dispersed in the fat, CHARACTERIZED IN THAT;

a) the oleic acid content of the fat phase is 45–80 wt % on fat phase, b) the saturated fatty acid content of the fat phase is 5–20 wt % on fat phase, c) the trans fatty acid content of the fat phase is 0–10 wt % on fat phase, and, d) the 18-carbon fatty acid content of the fat phase is 70–100 wt % on fat phase.

6 Claims, No Drawings

EDIBLE SPREAD BASED ON OLIVE OIL AS THE MAJOR FAT COMPONENT

This is a continuation of application Ser. No. 07/823,958, filed on Jan. 23, 1992, which is now abandoned.

The present invention concerns the technical field of edible spreads.

FIELD OF THE INVENTION

The present invention relates particularly to edible water-in-oil emulsions containing relatively high levels of mono-unsaturated fatty acids in the cis configuration.

In recent years there has been considerable debate as to the relative nutritional merits of polyunsaturated fats, saturated fats and mono-saturated fats. There has also been debate as to the health effects of low as opposed to high fat diets, vegetable as opposed to animal fats, diets low in mono-unsaturated trans fatty acids as opposed to diets rich in mono-unsaturated cis fatty acids and the relative merits of diets containing fatty acids of differing chain lengths i.e. the benefits of eighteen-carbon fatty acids as opposed to sixteen carbon fatty acids. Groups of consumers have exhibited a preference for fats which are relatively low in saturates, low in trans fatty acids, low in sixteen-carbon fatty acids and which contain some polyunsaturated fats.

A general technical problem which faces spreads manufactures is that vegetable fats containing polyunsaturated fatty acids, free of trans fatty acids and low in saturated fats tend to be liquid at room temperature. The fats employed as structuring agents or 'hardstocks' in spread formulation are generally more saturated, richer in trans fatty acids and richer in rather short or long chain fatty acids than the preferred liquid oils. Both the hardstocks and the liquid oils are well known to be generally poor in oleic acid, the mono-cis-unsaturated eighteen carbon fatty acid.

DESCRIPTION OF RELATED ART

A known solution to this problem is the use of olive oil in spread manufacture. Olive oil is particularly rich in mono-unsaturated fatty acids, having a reported content of 65–80% oleic acid. The remaining major components of olive oil are 4–15% linoleic acid and 9–18% saturated fatty acids. Olive oil was until recently the only effective natural source of mono-unsaturated cis fatty acids. However, progress in plant breeding has provided sunflower and other vegetable oils with a relatively high mono-unsaturate content.

Manufacture of olive oil for human or animal consumption requires nothing other than expression of the oil from the oil bearing materials and clarification of the oil by filtration. Such a process commonly includes so called cold-pressing and the product is referred to as "virgin olive oil". Commercial olive oil is often a blend of olive oils from a number of different sources, some or much of which may be refined olive oil. Legal definitions of what can and cannot be described as 'olive oil' are extant in many legal systems. Blends of around 10–20% wt virgin olive oil and around 80–90% refined olive oil are available in the marketplace as "olive oil". For the purposes of this specification the term 'olive oil' means either 'virgin' or refined olive oil. Olive oil is further described in BAILEY ("Industrial Oil and Fat Products": Wiley, Fourth Edition, Volume 1 page 368ff).

Prior use of olive oil as a component of edible spreads has been limited by the high cost of olive oil, although in some olive oil producing countries spreads based on or containing olive oil are known. One such spread has been sold in Greece under the brand-name 'Brio'. In this spread the fat phase comprises around 80 wt % of the product and consists of a blend of around 40 wt % olive oil and 60 wt % partially hardened olive oil. This known spread is rich in mono-cis eighteen-carbon fatty acid but relatively low in polyunsaturated fats, although the product is low in rather short and rather long chain fatty acids.

Other known uses of olive oil in spreads have included use as a flavouring component rather than a nutritional component. Such use has occurred in a product sold under the brand name 'Flora' in Spain. This known spread has comprised 80% wt of a fat phase consisting of around 2% olive oil, 58% of a vegetable oil rich in polyunsaturated fatty acids (such as sunflower oil, maize oil and blends of the same) and 40% of a partially hardened vegetable oil (such as soybean oil).

As well as considering the cost of raw materials and health or nutritional matters, spread manufacturers are required to consider the organoleptic properties of their products. The interaction of the various fats present in a spread is not fully understood and some combinations of fats may give rise to so-called 'crystallisation defects' by which the organoleptic properties of the spread are deleteriously modified. As a consequence, yet another complication is added to the difficult technical problem of fat phase formulation.

SUMMARY OF THE INVENTION

We have now determined a formulation for an acceptable spread of which a major fat component is olive oil.

Accordingly, the present invention provides an edible spread comprising from 80–5 wt % fat and 95–20 wt % of an aqueous phase dispersed in the fat, CHARACTERISED IN THAT;

a) the oleic acid content of the fat phase is 45–80 wt % on fat phase, b) the saturated fatty acid content of the fat phase is 5–20 wt % on fat phase, c) the trans fatty acid content of the fat phase is 0–10 wt % on fat phase, and, d) the 18-carbon fatty acid content of the fat phase is 70–100 wt % on fat phase.

Typically, the fat level is 55–65% on product. Products comprising around 60% fat are suitable for use as spreads for frying, cooking and baking purposes.

Preferably, no 4–14 carbon or 20–24 carbon fatty acid is present at a level of above 1 wt % on fat phase.

In order that the present invention may be further understood it is described below with reference to a specific example.

DESCRIPTION OF PREFERRED EMBODIMENTS

A spread was prepared by conventional spread processing techniques with the following composition:

| Oil Phase: (60 wt % on product) | |
|---|---|
| Olive Oil | 40 wt % on fat |
| Rapeseed Oil | 20 wt % on fat |
| Soybean Oil | 20 wt % on fat |
| Hydrog. Soybean Oil | 20 wt % on fat |

-continued

| Aq. Phase: (40 wt % on product) | |
|---|---|
| Spray Dried Milk Powder | 1% on product |
| Salt (NaCl) | 0.9% on product |
| Sorbic acid | 0.12% on product |
| Lactic acid | 0.04% on product |
| Monoglyceride | 0.08% on product |
| Lecithin | 0.08% on product |
| β-Carotene | trace |
| Flavour | trace |
| Vitamine A | trace |
| Vitamine D | trace |
| Balance water | |

The N-line of the fat phase is given below, as measured by NMR at the indicated temperature:

| | |
|---|---|
| 10° C. | 15–20 |
| 20° C. | 8–11 |
| 30° C. | 2–4 |
| 35° C. | 0–2 |

Gas-liquid chromatographic analysis of the fat phase revealed the following fatty acid spectrum:

| | |
|---|---|
| C12:0 | 0.14% |
| C14:0 | 0.35% |
| C16:0 | 11.39% {palmitic} |
| C16:1 | 0.56% |
| C18:0 | 6.36% {stearic} |
| C18:1 | 55.52% {oleic} |
| C18:2 | 18.76% {linoleic} |
| C18:3 | 3.52% |
| C20:1 | 0.19% |
| C22:0 | 0.45% |

What is claimed is:

1. An edible spread comprising from 80–5 wt % vegetable fat and 95–20 wt % of an aqueous phase dispersed in the fat, CHARACTERIZED IN THAT;

a) the oleic acid content of the fat phase is 45–80 wt % based on the weight of the fat phase, b) the saturated fatty acid content of the fat phase is 5–20 wt % based on the weight of the fat phase, c) the trans fatty acid content of the fat phase is 0–10 wt % based on the weight of the fat phase, and, d) the 18-carbon fatty acid content of the fat phase is 70–100 wt % based on the weight of the fat phase, the fat phase having an N-line as measured by NMR in the area:

$N_{10}$=15–20% $N_{20}$=8–11% $N_{30}$=2–4% and $N_{35}$=0–2%, said spread being further characterized by its freedom from animal fat and crystallization defects.

2. Spread according to claim 1 wherein the fat level is 55–65% based on the weight of the product.

3. Spread according to claim 1 or 2 wherein no 4–14 carbon or 20–24 carbon fatty acid is present at a level of above 1 wt % based on the weight of the fat phase.

4. An edible spread according to claim 1 consisting essentially of from 55–65% by weight of a fat phase and 45–35% by weight of an aqueous phase, the fat phase consisting essentially of 40% olive oil, 20% rapeseed oil, 20% soybean oil and 20% hydrogenated soybean oil.

5. A spread according to claim 1 wherein the oleic acid content is provided by olive oil; the spread is essentially free of 4–14 carbon and 20–24 carbon fatty acids.

6. A spread according to claim 1 wherein the fat phase consists essentially of olive oil, rapeseed oil, soybean oil and hydrogenated soy bean oil.

* * * * *